United States Patent
Nimour

(10) Patent No.: US 7,783,776 B2
(45) Date of Patent: Aug. 24, 2010

(54) METHOD OF DISTRIBUTING THE LOAD OF A MANAGEMENT CENTRE THAT TRANSMITS INFORMATION TO A LARGE NUMBER OF USER UNITS

(75) Inventor: Abdelkrim Nimour, Chatillon (FR)

(73) Assignee: Nagra France SAS, Paris (FR)

( * ) Notice: Subject to any disclaimer, the term of this patent is extended or adjusted under 35 U.S.C. 154(b) by 242 days.

(21) Appl. No.: 11/814,993

(22) PCT Filed: Jan. 26, 2006

(86) PCT No.: PCT/EP2006/050454

§ 371 (c)(1),
(2), (4) Date: Aug. 17, 2007

(87) PCT Pub. No.: WO2006/079640

PCT Pub. Date: Aug. 3, 2006

(65) Prior Publication Data

US 2008/0133728 A1 Jun. 5, 2008

(30) Foreign Application Priority Data

Jan. 27, 2005 (EP) ................................. 05290201

(51) Int. Cl.
G06F 15/16 (2006.01)
G06F 15/173 (2006.01)

(52) U.S. Cl. ...................................... 709/235; 709/223

(58) Field of Classification Search ....................... None
See application file for complete search history.

(56) References Cited

U.S. PATENT DOCUMENTS

| 6,490,645 | B1 | 12/2002 | Shahaf et al. | |
| 7,441,041 | B2 * | 10/2008 | Williams et al. | 709/232 |
| 2005/0129234 | A1 * | 6/2005 | Duval | 380/239 |

FOREIGN PATENT DOCUMENTS

| EP | 1346522 | 7/2002 |
| WO | 2004/100590 A | 11/2004 |

OTHER PUBLICATIONS

International Search Report from International Patent Application No. PCT/EP2006/050454, International Filing Date: Jan. 26, 2006.

* cited by examiner

Primary Examiner—Yemane Mesfin
(74) Attorney, Agent, or Firm—DLA Piper LLP US

(57) ABSTRACT

The present invention concerns a method for distribution of the load of a managing center transmitting information to a great number of user units, each unit receiving information after a request carried out while connecting to the managing center, characterized in that it comprises following steps: determining by the managing center of a number of units to process with said information, determining of a time period during which said number of units has to be processed, transmitting of a message to the user units comprising on one hand, the probability of connection of a unit to the managing center based on the number of units previously determined and on the other hand, the time period previously determined during which the unit connects according to said probability.

9 Claims, 2 Drawing Sheets

METHOD OF DISTRIBUTING THE LOAD OF A MANAGEMENT CENTRE THAT TRANSMITS INFORMATION TO A LARGE NUMBER OF USER UNITS

BACKGROUND

1. Field of the Invention

The present invention concerns the field of digital information transmission between a managing center and a plurality of user units connected to said center.

2. Technical Background

Such a situation arises for example in the field of digital pay television where a large number of subscribers' decoders are connected to a managing center. The information transmitted from the center comprises mainly data for updating rights contained in the security module associated to the decoder. These rights, bought by the user allowing the decryption of encrypted audio/video programs, have to be renewed frequently particularly when Video On Demand (VOD) services are used. The rights updating implies a generally short time connection of a decoder to the managing center. When the number of decoders reaches several millions and when they all attempt to connect in a same time interval, for example at subscriptions expiry, the managing center becomes rapidly overloaded.

For example in the field of wireless networks, a solution consists of calculating an access time at each connection attempt so that each unit can access the network in a given period. The document U.S. Pat. No. 6,490,645 describes a method wherein a plurality of users share an access to a resource such as a communication channel. Each user benefits from a priority and from a non-uniform probability distribution corresponding to this priority; the sum of the probability distributions being uniform. When a user desires to access to the resource, he selects a random number according his non-uniform probability distribution and calculates an access time based on this random number.

The document EP1346522 describes a solution consisting of connecting a first equipment seeking to establish a connection with a second one being in a reception state and to alternate the roles of emitter and receiver of each equipment. This alternating is carried out according to a probability distribution until the expiry of a predetermined test period or until the connection is established between the equipments. The length of the period during which an equipment plays the role of an emitter or of a receiver is controlled by the probability distribution.

The document WO2004/100590 describes a mobile communication system determining on the base of a number of mobile equipments the establishment of a communication either of a point-multi-points type or of a point-to-point type for transmitting multimedia data. Certain equipments are in standby mode while others maintain an active connection controlled by the system. The latter broadcasts a control message comprising an access probability factor in order to prevent the system overloading with responses to the control message. The connected equipments ignore the message and those in standby mode respond in function of the access probability factor. The system compares the number of received responses with a threshold and determines the type of connection to establish, i.e. point-multi-points or point-to-point. The system can also adapt the access probability factor in function of the number of responses.

The above described solutions are adapted to communication networks wherein the number of users desiring to access to a service provider is limited to several tens or hundreds. However, when this number reaches the millions, these solutions do not allow to solve, in a satisfactory way, the problem of the overloading of the managing center or of the central server. Moreover, certain units belonging to the network can be out of service at the moment they should have to be connected for their updating for example.

DESCRIPTION OF THE INVENTION

Figure 1:
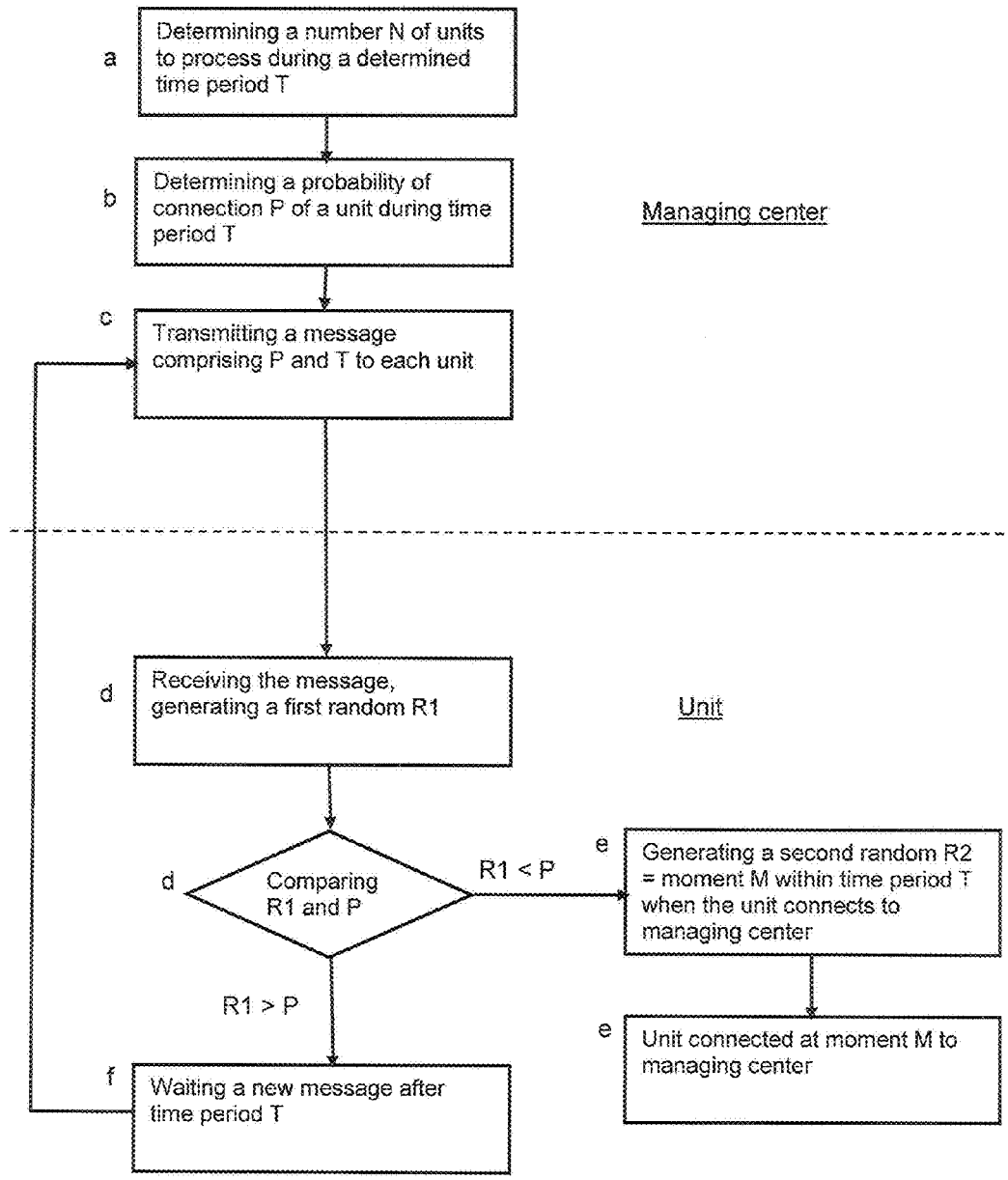
FIG. 1 shows a block diagram of a method according to an embodiment of the disclosure.

The aim of the present invention is to control the load of request messages transmitted to a managing center in order to prevent its overloading or at least to attenuate the load peaks. The latter arise when the number of units seeking to connect in a same time interval becomes important.

This aim is reached with a method for distribution of the load of a managing center transmitting information to a great number of user units, each unit receiving information after a request carried out while connecting to the managing center, characterized in that it comprises following steps:

determining by the managing center a number N of units to process with said information, determining of a time period T during which said number N of units has to be processed, transmitting a message to the user units comprising on one hand, a probability of connection P of a unit to the managing center based on the number N of units previously determined and on the other hand, the time period T previously determined during which the unit connects according to said probability P.

The message is directed to each unit controlled by the managing center. At reception of the message, each unit generates a random number R1 and compares it to the received probability P. If this number R1 is smaller than the probability P, the unit has the right to connect to the managing center. It generates afterwards another random number R2 for determining the moment M at which it connects, this moment M being comprised in the time period T included in the received message. When this number R1 is greater than the probability P, the unit will not connect and has to wait for a new message after which a new random number will be generated allowing or not a connection. The process of transmission and reception of the message is repeated at the end of each determined time period T in order to process all units of the network during a given time interval. At each process or after a certain number of repetitions of the process, the probability of connection P is increased because the units previously processed and recorded by the managing center are no longer counted.

As the units connects at moments M determined randomly by the managing center and not at fixed time periods, the load peaks are suppressed or strongly attenuated. The load curve in function of the time becomes thus more uniform.

According to an embodiment, the probability of connection P can be increased in function of the number of units out of service. The managing center estimates that a constant percentage of units will not connect in a given time period because they are either powered off or defective. During the determination of the number N of units to process, the managing center takes this factor in account for increasing the connection probability P, which will be transmitted in the message to the units of the network. This increase is calculated for maintaining a fixed number of units that connect during the defined time period T.

According to another embodiment, the probability P can also be adapted in function of the current time knowing that the number of units in service is greater at evening and at night than during the daytime for example.

In the digital pay television application, the units in question are subscribers' decoders that connect periodically to the managing center of the operator for carrying out updating of television programs reception rights.

For example, the number of decoders of a network controlled by a managing center is 1 million. The center defines a number N of decoders to process: 1000 during a time period T of one minute, this rate depending on the processing capacity of the server or on its admissible load during a given period. The probability of connection P during one minute is then $1/1000$. The message transmitted to the decoder will then contain this probability P of $1/1000$ and the time period T of one minute.

According to a preferred realization, the data of probability P and of time period T are included in a control message ECM (Entitlement Control Message) transmitted regularly to all decoders and allowing the decryption of the broadcasted programs.

At reception of the ECM message, the decoder generates a random number R1 comprised between 0 and 1 and if it is smaller than the probability P, the decoder generates another random number R2 defining the moment M of connection within the time period T of one minute or the waiting time before connection. The managing center transmits this message all minutes allowing all active decoders to connect. These connections are accounted by the managing center in order to increase the probability P in function of the number N of decoders already updated. With 1 million of decoders, the probability P can progress from $1/1000$ for example to $1/900$, $1/800$, $1/700$, etc. Taking in account a rate of active decoders of 80%, the initial probability P can be increased to $1/800$.

When the number of active decoders increase during the night for example, the initial probability P will be fixed at a lower value, for example $1/2000$, in order to prevent an excessive number of connections during a given time period T (e.g., one minute), leading to the overloading of the server.

According to an embodiment, the managing center does not evaluate the number of active decoders able to receive messages. It transmits, in a first step, messages with a low connection probability P corresponding to a smaller processing capacity than the nominal capacity of the server. Afterwards, during further steps, this probability P is increased in function of the connections carried out successfully in order to reach the effective capacity or a predefined load of the server.

According to another embodiment, the connection probability P can be regulated in function of the number of active decoders and the capacity of the server with a feedback loop. When the number of connections becomes too important or exceeds a given threshold, a warning message is sent by the server of the managing center to the generator of the ECM control messages in order to reduce the connection probability P. In the contrary case, when the number of connections decreases or is smaller than a given value, another warning message leads to an increase of this probability P transmitted by the ECM messages.

In general, it has to be noted that the connection probability P is adapted for maintaining the value of the processing load rate of the server according to a value defined by the server whatever is the number of active decoders connected to the network.

FIG. 1 shows a block diagram of a method according to an embodiment of the disclosure.

Figure 2:
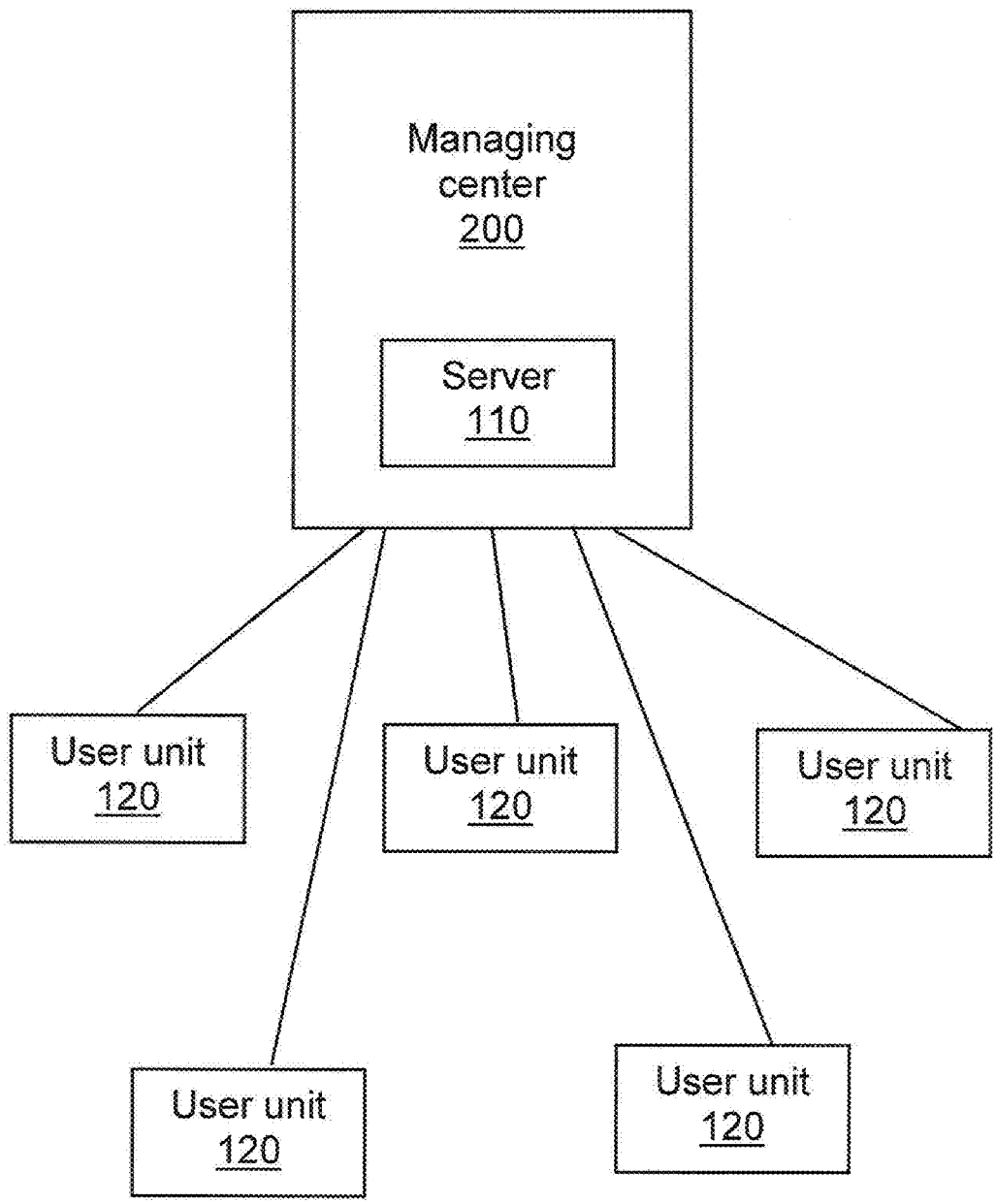
FIG. 2 shows a block diagram of a system according to an embodiment of the disclosure.

FIG. 2 shows a block diagram of a system according to an embodiment of the disclosure. FIG. 2 shows a managing center 100 with a server 110 and multiple user units 120 connected to the managing center 100.

The invention claimed is:

1. A method for distribution of the load of a managing center transmitting information to a plurality of user units, comprising:

determining by the managing center a time period for processing user units and a number of user units to process during the time period, each user unit receiving the information from the managing center after a request is carried out by the user unit while connecting to the managing center;

determining by the managing center a probability of connection to the managing center by a user unit from the plurality of user units during the time period;

transmitting to each user unit a message comprising the probability of connection to the managing center and the time period;

generating at a user unit receiving the message from the managing center a first random number;

comparing at the user unit the first random number with the probability of connection included in the message;

when the first random number is lower than the probability of connection included in the message, generating at the user unit a second random number;

determining a time within the time period at which the user unit is to connect to the managing center based on the second random number; and when the first random number is higher than the probability of connection, waiting during the time period, for a new message from the managing center;

wherein the probability of connection is increased for a time period subsequent to the time period based on the number of user units that have been connected successfully during the time period, the managing center being configured to record the connections carried out during the time period; and wherein the user units include decoders connected to a server of the managing center, said decoders transmitting requests to the server of the managing center for updating access rights to broadcasted programs, said server transmitting an entitlement control message (ECM) to the decoders comprising a probability of connection and a time period during which an active decoder connects to the server of the managing center for carrying out its updating according to the probability of connection received by the active decoder in the ECM.

2. The method according to claim 1, wherein the number of units to process during the time period is based on a processing capacity of a server of the managing center or on an admissible load of the server during a given time period.

3. The method according to claim 1, wherein the probability of connection is determined based on the number of user units that are active and able to connect to the managing center.

4. The method according to claim 1, wherein the probability of connection is increased for a time period subsequent to the time period when the number of user units out of service for the time period subsequent to the time period is larger than the number of user units out of service for the time period.

5. The method according to claim 2, wherein the probability of connection for the time period is determined based on a processing capacity smaller than the nominal processing capacity of the server of the managing center and the probability of connection is increased for a time period subsequent to the time period based on the number of connections carried out successfully during the time period, the probability of connection being increased over one or more time periods subsequent to the time period to reach an effective processing capacity corresponding to the nominal processing capacity or to reach a predefined load of said server of the managing center.

6. The method according to claim 1, wherein the probability of connection is regulated based on the number of active user units and on the processing capacity of the managing center.

7. The method according to claim 1, further comprising sending by a server of the managing center a warning message to a messages generator of the managing center to reduce the probability of connection when the number of connections of user units to the managing center exceeds a given threshold.

8. The method according to claim 6, further comprising sending by a server of the managing center a warning message to a messages generator of the managing center to increase the probability of connection when the number of connections of user units to the managing center is smaller than a given number.

9. The method according to claim 1, wherein the process of transmission and reception of the message by a user unit is repeated according to a time interval defined by the time period until all the active user units connect to the managing center.

* * * * *